United States Patent
Taguchi et al.

(10) Patent No.: US 11,451,086 B2
(45) Date of Patent: Sep. 20, 2022

(54) AUXILIARY POWER SUPPLY DEVICE AND INDUSTRIAL MACHINE

(71) Applicant: FANUC CORPORATION, Minamitsuru-gun (JP)

(72) Inventors: Taichi Taguchi, Yamanashi-ken (JP); Youhei Kondou, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/067,672

(22) Filed: Oct. 10, 2020

(65) Prior Publication Data

US 2021/0111584 A1 Apr. 15, 2021

(30) Foreign Application Priority Data

Oct. 15, 2019 (JP) .............................. JP2019-188744

(51) Int. Cl.
*H02J 9/06* (2006.01)
*G05B 19/4155* (2006.01)

(52) U.S. Cl.
CPC .......... *H02J 9/062* (2013.01); *G05B 19/4155* (2013.01); *G05B 2219/34013* (2013.01)

(58) Field of Classification Search
CPC .. H02J 9/062; H02J 7/0048; H02J 7/34; H02J 9/061; G05B 19/4155; G05B 2219/34013
See application file for complete search history.

(56) References Cited

U.S. PATENT DOCUMENTS

| 2013/0318956 | A1* | 12/2013 | Yunoue | B60K 6/28 60/431 |
| 2015/0044512 | A1* | 2/2015 | Kawaguchi | H01M 50/271 429/100 |
| 2018/0372514 | A1* | 12/2018 | Nisino | G01D 5/24466 |
| 2021/0098946 | A1* | 4/2021 | Davis | H02J 7/00 |

FOREIGN PATENT DOCUMENTS

| JP | 2007-292608 A | 11/2007 |
| JP | 2007292608 | * 11/2007 |
| JP | 2012-106300 A | 6/2012 |
| WO | WO2018145324 | * 8/2018 |

* cited by examiner

*Primary Examiner* — Toan T Vu
(74) *Attorney, Agent, or Firm* — McGinn I.P. Law Group, PPLC.

(57) ABSTRACT

An auxiliary power supply device supplies electric power to an encoder when supply of electric power of a control device is cut off, and includes: a backup power source for supplying backup electric power to the encoder when supply of electric power of the control device is cut off; an auxiliary power source for supplying electric power to the encoder when the backup power source is removed; a remaining capacity determination unit for determining the remaining capacity of the auxiliary power source; a display unit for displaying an indication that the remaining capacity is insufficient when the remaining capacity determined by the remaining capacity determination unit is lower than a threshold; and a switch for actuating the display unit.

19 Claims, 5 Drawing Sheets

AUXILIARY POWER SUPPLY DEVICE AND INDUSTRIAL MACHINE

CROSS-REFERENCE TO RELATED APPLICATION

This application is based upon and claims the benefit of priority from Japanese Patent Application No. 2019-188744 filed on Oct. 15, 2019, the contents of which are incorporated herein by reference.

BACKGROUND OF THE INVENTION

Field of the Invention

The present invention relates to an auxiliary power supply device capable of supplying electric power to an encoder and an industrial machine.

Description of the Related Art

Japanese Laid-Open Patent Publication No. 2012-106300 discloses a configuration in which a battery unit including a spare battery used when the main battery runs out is provided so as to maintain the stored contents of a storage unit by supplying electric power from the spare battery even when the remaining capacity of the main battery runs out. In Japanese Laid-Open Patent Publication No. 2012-106300, since the stored contents in the storage unit are maintained by the power supply from the spare battery, information on the positions of the respective axes of a transfer robot can be held in the storage unit.

SUMMARY OF THE INVENTION

However, in Japanese Laid-Open Patent Publication No. 2012-106300, the contents stored in the storage unit are lost if the main battery is replaced while the remaining capacity of the spare battery is insufficient.

It is therefore an object of the present invention to provide an auxiliary power supply device and an industrial machine that can prevent the loss of information on an encoder.

According to one aspect of the present invention, there is provided an auxiliary power supply device configured to supply electric power to an encoder when supply of electric power of a control device is cut off, the auxiliary power supply device including: a backup power source configured to supply backup electric power to the encoder when supply of electric power of the control device is cut off; an auxiliary power source configured to supply electric power to the encoder when the backup power source is removed; a remaining capacity determination unit configured to determine the remaining capacity of the auxiliary power source; a display unit configured to display an indication that the remaining capacity is insufficient when the remaining capacity determined by the remaining capacity determination unit is lower than a threshold; and a switch configured to actuate the display unit.

According to another aspect of the present invention, there is provided an industrial machine that includes the above-described auxiliary power supply device.

According to the present invention, it is possible to provide an auxiliary power supply device and an industrial machine capable of preventing an encoder from losing information.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An auxiliary power supply device and an industrial machine according to the present invention will be detailed by describing preferred embodiments below with reference to the accompanying drawings.

First Embodiment

Figure 1:
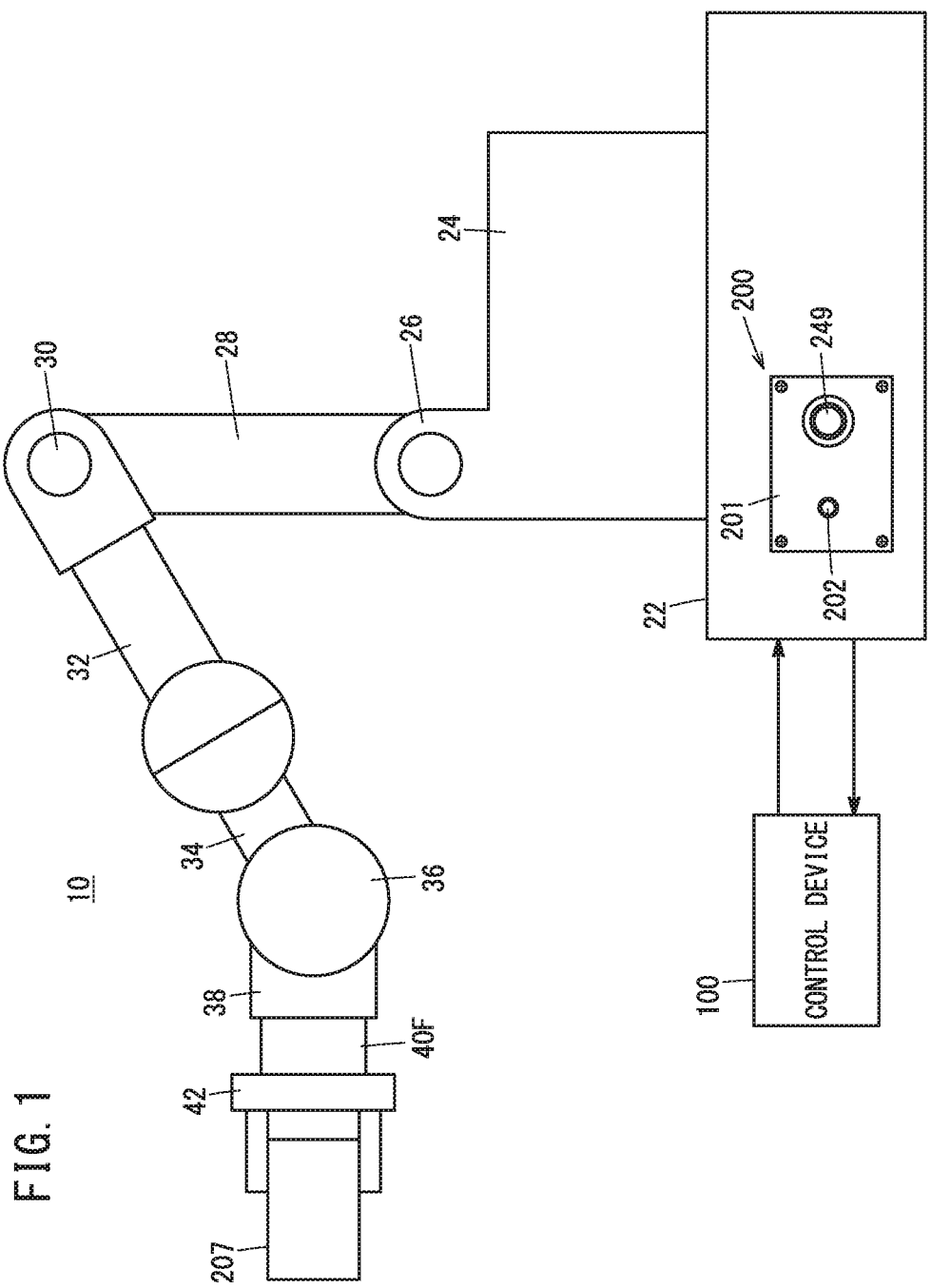
FIG. 1 is a block diagram showing an industrial machine according to a first embodiment.
Figure 2:
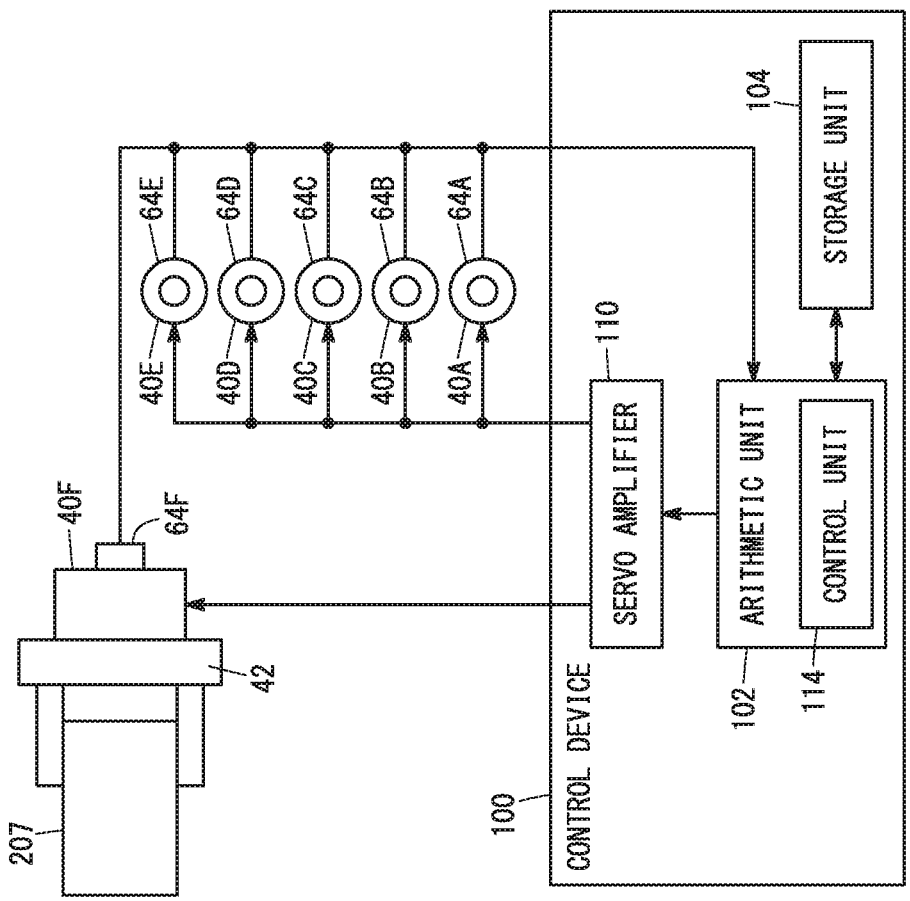
FIG. 2 is a block diagram showing a part of the industrial machine according to the first embodiment.

An auxiliary power supply device and an industrial machine according to a first embodiment will be described with reference to FIGS. 1 to 4. FIG. 1 is a block diagram showing an industrial machine according to the present embodiment. FIG. 2 is a block diagram showing a part of the industrial machine according to the present embodiment.

As shown in FIG. 1, an industrial machine 10 according to the present embodiment is, for example, a robot. More specifically, the industrial machine 10 is an articulated robot. The industrial machine 10 is provided with a control device 100. The control device 100 controls the entire industrial machine 10.

The industrial machine 10 includes a base 22, a swivel unit 24, a first joint 26, a first arm 28, a second joint 30, a second arm 32, a third arm 34, a third joint 36, a fourth arm 38, a servo motor (sixth servo motor) 40F, and a hand 42. A reference numeral 40 is used to describe servo motors in general, and reference numerals 40A to 40F are used to describe individual servo motors.

Figure 4:
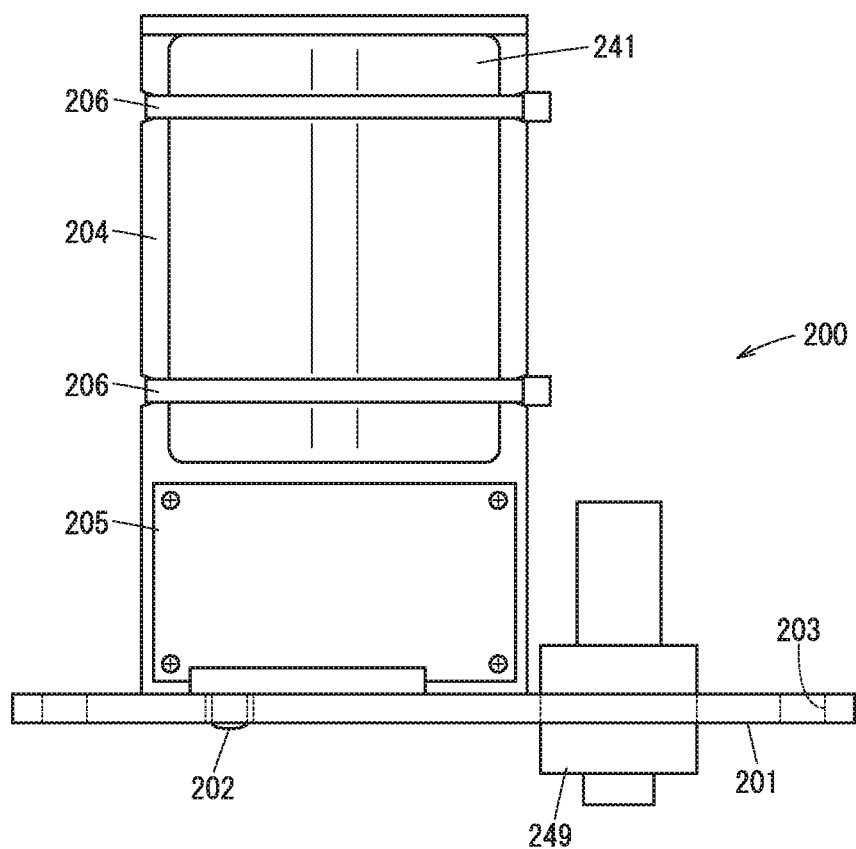
FIG. 4 is a diagram showing the auxiliary power supply device according to the first embodiment.

The base 22 is set on an installation surface. The base 22 is provided with an unillustrated housing for housing an auxiliary power supply device 200. The auxiliary power supply device 200 is housed in the housing. The auxiliary power supply device 200 includes a front panel 201 described later. By screwing the front panel 201 to the base 22, the auxiliary power supply device 200 as shown in FIG. 4 is fixed to the base 22.

The swivel unit 24 is supported by the base 22. The swivel unit 24 swivels by receiving the driving force of a servo motor (first servo motor) 40A (FIG. 2).

The first arm 28 is supported by the swivel unit 24. The first arm 28 receives the driving force of a servo motor (second servo motor) 40B (FIG. 2) and thereby rotates about the first joint 26.

The second arm 32 is supported by the first arm 28. The second arm 32 receives the driving force of a servo motor (third servo motor) 40C (FIG. 2) and thereby rotates about the second joint 30.

The third arm 34 is attached to the distal end of the second arm 32. The third arm 34 receives the driving force of the servo motor (fourth servo motor) 40D (FIG. 2) and thereby rotates about the axis of the second arm 32. The fourth arm 38 is supported by the third arm 34.

The fourth arm 38 receives the driving force of a servo motor (fifth servo motor) 40E (FIG. 2) and thereby rotates about the third joint 36.

The servo motor 40F is attached to the distal end of the fourth arm 38. The hand 42 is attached to the output shaft of the servo motor 40F. The hand 42 receives the driving force of the servo motor 40F and thereby rotates about the output shaft of the servo motor 40F. The hand 42 can hold a workpiece 207, for example, but is not limited thereto.

As shown in FIG. 2, the control device 100 includes an arithmetic unit 102 and a storage unit 104. The arithmetic unit 102 can be configured by, for example, a CPU (Central Processing Unit), but is not limited to this. The storage unit 104 includes, for example, an unillustrated volatile memory and an unillustrated nonvolatile memory. Examples of the volatile memory include RAM (Random Access Memory) and the like. Examples of the non-volatile memory include ROM (Read Only Memory) and flash memory. Programs, data, etc., may be stored in the storage unit 104.

The control device 100 further includes a servo amplifier 110. The servo motors 40A to 40F are electrically connected to the servo amplifier 110. The servo motors 40A to 40F are driven by the drive current supplied from the servo amplifier 110.

The servo motors 40A to 40F include encoders (absolute encoders) 64A to 64F, respectively. The encoders 64A to 64F each detect the rotational position of the output shaft of the associated servo motor 40A to 40F. The encoders 64A to 64F each output a signal indicating the rotational position to a control unit 114 described later. The servo motors 40A to 40F are feedback-controlled based on the signals output from the encoders 64A to 64F. A reference numeral 64 is used when describing encoders in general, and reference numerals 64A to 64F are used to describe individual encoders.

The arithmetic unit 102 includes a control unit 114. The control unit 114 can be realized by the arithmetic unit 102 executing a program stored in the storage unit 104.

The servo amplifier 110 is a driver for rotationally driving the servo motors 40A to 40F provided in the industrial machine 10. The servo amplifier 110 supplies a drive current to the servo motors 40A to 40F in response to a command signal supplied from the control unit 114.

Figure 3:
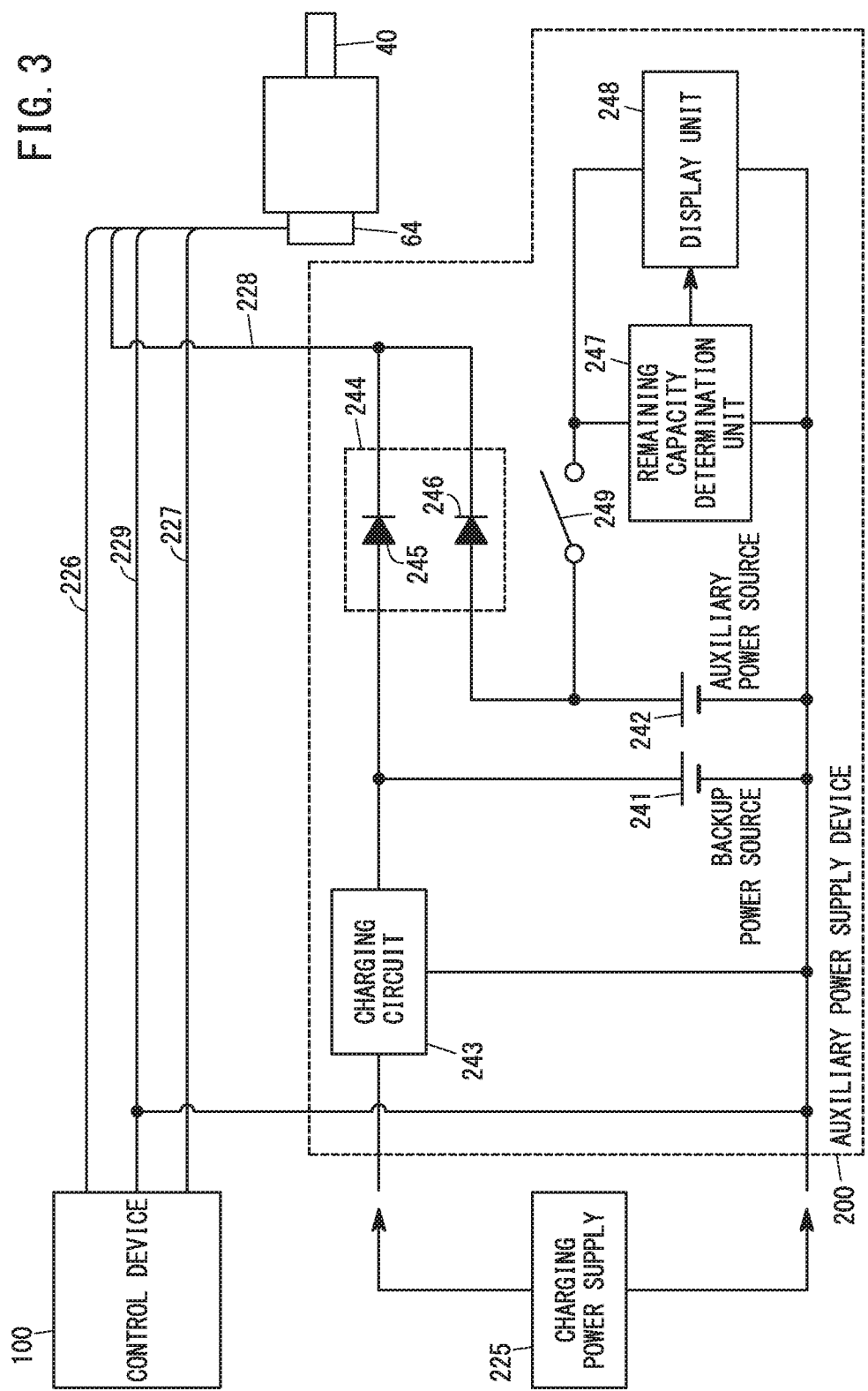
FIG. 3 is a diagram showing an auxiliary power supply device according to the first embodiment.

FIG. 3 is a diagram showing the auxiliary power supply device according to the present embodiment. FIG. 3 shows a state in which the control device 100 and the auxiliary power supply device 200 are connected to the encoder 64. As described above, the industrial machine 10 according to the present embodiment includes a plurality of encoders 64, but for the sake of simplifying the description, only one encoder 64 is illustrated in FIG. 3.

A main power line 226, a ground line 229, and a data communication signal line 227 are provided between the control device 100 and the encoder 64. The main power line 226 serves to supply electric power from the control device 100 to the encoder 64. The ground line 229 is connected to the ground potential (0V). The data communication signal line 227 serves to supply a signal output from the encoder 64, that is, the signal indicating the rotational position, to the control unit 114.

When electric power is being supplied to the control device 100, electric power is supplied from the control device 100 to the encoder 64 via the main power line 226. When supply of the power from the control device 100 is cut off, no power is supplied from the control device 100 to the encoder 64. When supply of the power from the control device 100 is stopped, power can be supplied from the auxiliary power supply device 200 to the encoder 64 via a backup power line 228. The reason why power is supplied from the auxiliary power supply device 200 to the encoder 64 when power supply of the control device 100 is cut off, is to prevent the encoder 64 from losing the information indicating the rotational position.

The auxiliary power supply device 200 is equipped with a backup power source 241 and an auxiliary power source 242. The backup power source 241 is configured to supply backup power to the encoder 64 when supply of the power of the control device 100 is cut off. The auxiliary power source 242 is configured to supply power to the encoder 64 when the backup power source 241 is taken out (removed). The backup power source 241 can be configured by, for example, a secondary battery, which is a rechargeable battery. The auxiliary power source 242 can be configured by, for example, a non-rechargeable primary battery.

FIG. 4 is a diagram showing the auxiliary power supply device. FIG. 4 shows a state in which the auxiliary power supply device 200 is viewed from a direction normal to the main surface of a base body 204 of the auxiliary power supply device 200.

As shown in FIG. 4, the auxiliary power supply device 200 has a front panel 201. The front panel 201 has, formed therein, screw holes 203 to enable the front panel 201 to be screwed to the base 22. An LED indicator 202 and a switch 249 are attached to the front panel 201.

The auxiliary power supply device 200 further includes a base body 204. The base body 204 is fixed to the rear side of the front panel 201. A printed circuit board 205 is attached to the base body 204. The printed circuit board 205 is provided with a remaining capacity determination circuit that constitutes a remaining capacity determination unit 247 described later. The printed circuit board 205 further includes an unillustrated display control circuit for controlling display of a display unit 248 described later. The display control circuit forms the display unit 248 together with the LED indicator 202 described later. The printed circuit board 205 is fixed to the base body 204 by screwing. For example, the backup power source 241 is attached to the upper surface side of the base body 204. The auxiliary power source 242 is attached to the lower surface side of the base body 204, for example. The backup power source 241 and the auxiliary power source 242 are fixed to the base body 204 by cable ties (e.g., Ty-Rap) 206. When the auxiliary power supply device 200 is housed in the base 22, the base body 204, the printed circuit board 205, the backup power source 241, the auxiliary power source 242, etc. are located in the unillustrated housing provided in the base 22.

As shown in FIG. 3, the auxiliary power supply device 200 further includes a charging circuit 243. The charging circuit 243 can charge the backup power source 241.

A charging power supply 225 is connected to the auxiliary power supply device 200. Electric power supplied from the charging power source 225 is supplied to the charging circuit 243. The charging circuit 243 uses the power supplied from the charging power supply 225 to charge the backup power source 241.

The auxiliary power supply device 200 further includes a power supply switching circuit 244. The power supply switching circuit 244 includes a diode 245 and a diode 246. The anode of the diode 245 is connected to the positive electrode of the backup power source 241. The cathode of the diode 245 is connected to the encoder 64 via the backup power line 228. The anode of the diode 246 is connected to the positive electrode of the auxiliary power source 242. The cathode of the diode 246 is connected to the encoder 64 via the backup power line 228. The auxiliary power supply device 200 is configured to supply the higher voltage of the output voltages of the backup power source 241 and the auxiliary power source 242, to the encoder 64.

The output voltage of the backup power source 241 that is not deteriorated and is fully charged, is set to be higher than the output voltage of the unused auxiliary power source 242. When the output voltage of the backup power source 241 is higher than the output voltage of the auxiliary power source 242, the power supply switching circuit 244 can supply the output voltage from the backup power source 241 to the encoder 64. When the output voltage of the backup power source 241 becomes lower than the output voltage of the auxiliary power source 242, the power supply switching circuit 244 can supply the output voltage from the auxiliary power source 242 to the encoder 64.

In the diodes 245 and 246, a voltage drop occurs by the amount of the forward voltage of the diodes 245 and 246. Therefore, the output voltage of the backup power source 241 and the output voltage of the auxiliary power source 242 are set in consideration of the voltage drops across the diodes 245 and 246.

When the backup power source 241 deteriorates, the backup power source 241 can be replaced. In replacing the backup power source 241, the power supply of the control device 100 may be cut off. For example, when the industrial machine 10 is a robot or the like, the power supply of the control device 100 is cut off in order to ensure safety. When the backup power source 241 is replaced while the remaining capacity of the auxiliary power source 242 is sufficient, a sufficient power is supplied from the auxiliary power source 242 to the encoder 64 even if the power supply of the control device 100 is cut off. Therefore, the encoder 64 will never lose information indicative of the rotational position. However, in the auxiliary power source 242, the remaining capacity may be insufficient. When the backup power source 241 is replaced in a state where the power source of the control device 100 is cut off and the remaining capacity of the auxiliary power source 242 is insufficient, the loss of information on the rotational position will occur in the encoder 64.

The auxiliary power supply device 200 further includes the remaining capacity determination unit 247 and the display unit 248. The remaining capacity determination unit 247 can detect the voltage between the positive electrode and the negative electrode of the auxiliary power source 242. The remaining capacity determination unit 247 can determine the remaining capacity of the auxiliary power source 242 based on the voltage between the positive electrode and the negative electrode of the auxiliary power source 242. The remaining capacity determination unit 247 can supply a signal according to the remaining capacity of the auxiliary power source 242, to the display unit 248.

The display unit 248 can display an indication that the remaining capacity is insufficient if the remaining capacity of the auxiliary power source 242 determined by the remaining capacity determination unit 247 is lower than a threshold. When a signal indicating that the remaining capacity of the auxiliary power source 242 is lower than the threshold is supplied from the remaining capacity determination unit 247, the display unit 248 displays an indication that the remaining capacity is insufficient.

The display unit 248 includes the LED indicator 202. The LED indicator 202 is, for example, an LED lamp, but is not limited to this. The display unit 248 can use the LED indicator 202 to display an indication that the remaining capacity of the auxiliary power source 242 is insufficient. For example, when the remaining capacity of the auxiliary power source 242 is equal to or greater than the threshold, the display unit 248 does not turn on the LED indicator 202. When the remaining capacity of the auxiliary power source 242 is lower than the threshold, the display unit 248 lights the LED indicator 202 in red.

It should be noted that the method of displaying insufficiency of the remaining capacity of the auxiliary power source 242 is not limited to the above. The LED indicator 202 may be configured to light in green when the remaining capacity of the auxiliary power source 242 is equal to or greater than the threshold and light in red when the remaining capacity of the auxiliary power source 242 is lower than the threshold.

The auxiliary power supply device 200 further includes a switch 249. The switch 249 is a switch for supplying power to the remaining capacity determination unit 247 and the display unit 248, that is, a switch for operating the remaining capacity determination unit 247 and the display unit 248. The switch 249 is, for example, a mechanical switch. The switch 249 may be configured by, for example, a push button switch, but is not limited to this. The remaining capacity determination unit 247 and the display unit 248 are connected to the positive electrode of the auxiliary power source 242 via the switch 249. When the switch 249 is turned on, the output voltage of the auxiliary power source 242 is supplied to the remaining capacity determination unit 247 and the display unit 248. When the switch 249 is turned off, the output voltage of the auxiliary power source 242 is not supplied to either the remaining capacity determination unit 247 or the display unit 248. That is, the output voltage of the auxiliary power source 242 is supplied to the display unit 248 and the like only when the switch 249 is turned on. When the switch 249 is in the off state, no power is consumed by the display unit 248 and the like, so that reduction in the remaining capacity of the auxiliary power source 242 can be prevented.

As described above, according to the present embodiment, the auxiliary power supply device 200 is provided with the display unit 248 capable of displaying an indication that the remaining capacity of the auxiliary power source 242 is insufficient. Therefore, the user or the like can grasp and know whether or not the remaining capacity of the auxiliary power source 242 is insufficient. Therefore, according to the present embodiment, it is possible to prevent the backup power source 241 from being replaced when the remaining capacity of the auxiliary power source 242 is insufficient, and hence prevent the encoder 64 from losing information.

Second Embodiment

Figure 5A:
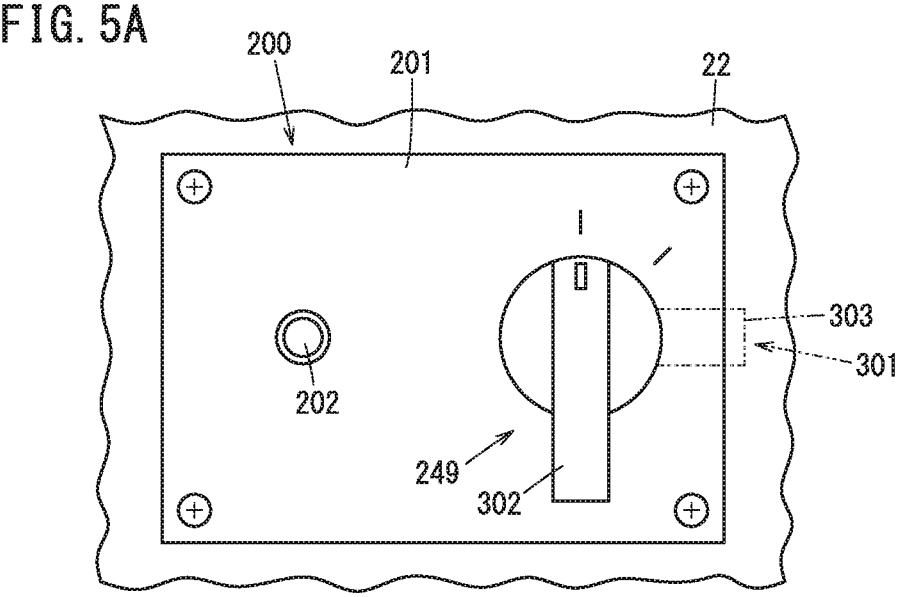
FIGS. 5A and 5B are diagrams showing an auxiliary power supply device according to a second embodiment.
Figure 5B:
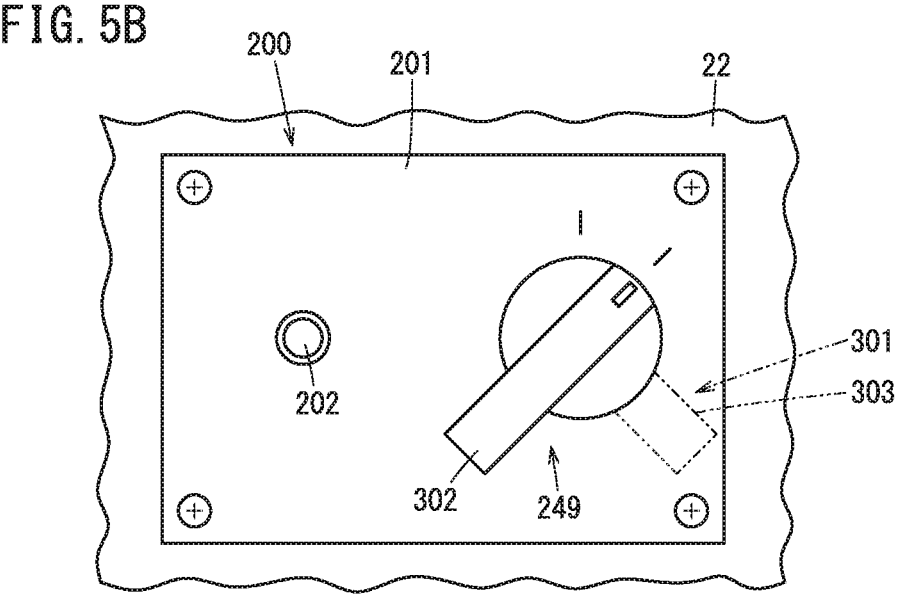

The auxiliary power supply device and the industrial machine according to a second embodiment will be described with reference to FIGS. 5A and 5B. FIGS. 5A and 5B are diagrams showing an auxiliary power supply device according to the present embodiment. FIG. 5A shows a state in which a switch 249 is set so as not to allow a display unit 248 to operate. FIG. 5B shows a state in which the switch 249 is set so as to allow the display unit 248 to operate. The same components as those of the auxiliary power supply device and the industrial machine according to the first embodiment are allotted with the same reference numerals, and description thereof will be omitted or simplified.

The auxiliary power supply device 200 according to the present embodiment further includes a lock mechanism 301 for preventing the backup power source 241 from being removed (detached). The lock mechanism 301 is unlocked when the switch 249 is operated so as to actuate the display unit 248.

In this embodiment, the switch 249 is composed of, for example, a rotary switch. The switch 249 is attached to the front panel 201. The switch 249 is provided with a lever 302. The lever 302 is located in front of the front panel 201. An unillustrated switch body is located behind the front panel 201. The switch 249 is provided with a bar 303 that rotates integrally with the lever 302. The bar 303 is located behind the front panel 201. When the switch 249 is set so that the display unit 248 does not operate, as shown in FIG. 5A, part of the bar 303 and part of the wall of the base 22 overlap with each other. Therefore, when the auxiliary power supply device 200 is attempted to be removed in the state as shown in FIG. 5A, the part of the bar 303 is caught by the wall of the base 22, so that the auxiliary power supply device 200 cannot be removed. That is, in the state shown in FIG. 5A, the lock mechanism 301 can prohibit the backup power source 241 from being removed.

When the switch 249 is operated so as to actuate the display unit 248, as shown in FIG. 5B, the bar 303 will not overlap the wall surface of the base 22. Therefore, when the auxiliary power supply device 200 is tried to be removed in the state shown in FIG. 5B, the bar 303 will not get caught on the wall of the base 22, so that the auxiliary power supply device 200 can be removed. That is, the lock mechanism 301 is unlocked by operating the switch 249 so as to actuate the display unit 248.

It should be noted that the lock mechanism 301 is not limited to the above configuration. Any lock mechanism can be used as appropriate as long as it can be unlocked by operating the switch 249 so as to actuate the display unit 248.

In the above way, in this embodiment, the lock mechanism 301 cannot be unlocked unless the switch 249 is operated so as to actuate the display unit 248. If the lock mechanism 301 is not unlocked, the backup power source 241 cannot be replaced because the auxiliary power supply device 200 cannot be taken out from the housing. Therefore, according to the present embodiment, the switch 249 must be operated so as to actuate the display unit 248 before replacement of the backup power source 241. When the switch 249 is operated so as to actuate the display unit 248, it is possible for the user or the like to grasp and know whether or not the remaining capacity of the auxiliary power source 242 is insufficient. Therefore, according to the present embodiment, it is possible to avoid a situation where the backup power source 241 is replaced without the user or the like checking whether or not the remaining capacity of the auxiliary power source 242 is insufficient. Therefore, according to the present embodiment, it is possible to provide the auxiliary power supply device 200 that can more surely prevent the encoder 64 from losing information.

[Modification]

Though the preferred embodiments of the present invention have been described above, the present invention is not limited to the above embodiments, and various modifications can be made without departing from the gist of the present invention.

For example, the above embodiment has been described by giving an example in which the industrial machine 10 is a robot, however, the present invention is not limited to this. The industrial machine 10 may be, for example, a machine tool, an injection molding machine, a mining machine, a woodworking machine, an agricultural machine, a construction machine, and the like.

Further, the above embodiment has been described by giving an example in which, when the switch 249 is turned off, the output voltage of the auxiliary power source 242 is not supplied to the display unit 248 and also not supplied to the remaining capacity determination unit 247. However, the invention is not limited to this. When the power consumption of the remaining capacity determination unit 247 is sufficiently small, the auxiliary power source 242 may be configured to constantly supply an output voltage to the remaining capacity determination unit 247 regardless of whether the switch 249 is on or off.

Further, the above embodiment has been described by giving an example in which the backup power source 241 is charged using the charging power supply 225 and the charging circuit 243. However, the present invention is not limited to this. When the remaining capacity of the backup power source 241 decreases, the backup power source 241 may be removed from the auxiliary power supply device 200 and another charged backup power source 241 may be attached to the auxiliary power supply device 200. In this case, the charging power supply 225 and the charging circuit 243 become unnecessary.

The above embodiments are summarized as follows.

An auxiliary power supply device (200) supplies electric power to an encoder (64) when supply of electric power of a control device (100) is cut off, and includes: a backup power source (241) configured to supply backup electric power to the encoder when supply of electric power of the control device is cut off; an auxiliary power source (242) configured to supply electric power to the encoder when the backup power source is removed; a remaining capacity determination unit (247) configured to determine the remaining capacity of the auxiliary power source; a display unit (248) configured to display an indication that the remaining capacity is insufficient when the remaining capacity determined by the remaining capacity determination unit is lower than a threshold; and a switch (249) configured to actuate the display unit. According to this configuration, the user or the like can grasp whether or not the remaining capacity of the auxiliary power source is insufficient. Therefore, this configuration makes it possible to prevent the backup power source from being replaced when the auxiliary power source is insufficient in remaining capacity, and thus prevent the encoder from losing information.

The switch may be a mechanical switch.

The above auxiliary power supply device further includes a lock mechanism (301) configured to prevent removal of the backup power source, and the lock mechanism may be configured to be unlocked when the switch is operated so as to actuate the display unit. According to this configuration, the lock mechanism is not unlocked unless the switch is operated to actuate the display unit. It is impossible to take out (remove) the backup power source unless the lock mechanism is unlocked. Therefore, in this configuration, the switch must be operated so as to actuate the display unit before removal of the backup power source. When the switch is operated so as to actuate the display unit, the user or the like can grasp whether or not the remaining capacity of the auxiliary power source is insufficient. Therefore, this configuration makes it possible to avoid a situation where the backup power source is replaced without the user or the like grasping whether or not the remaining capacity of the auxiliary power source is insufficient. Thus, according to this configuration, it is possible to provide an auxiliary power supply device that can more surely prevent the encoder from losing information.

An industrial machine (10) includes the auxiliary power supply device as described above.

What is claimed is:

1. An auxiliary power supply device configured to supply electric power to an encoder when supply of electric power of a control device is cut off, comprising:
   a backup power source configured to supply backup electric power to the encoder when supply of electric power of the control device is cut off;
   an auxiliary power source configured to supply electric power to the encoder when the backup power source is removed;
   a remaining capacity determination unit configured to determine a remaining capacity of the auxiliary power source;
   a display unit configured to display an indication that the remaining capacity is insufficient when the remaining capacity determined by the remaining capacity determination unit is lower than a threshold;
   a switch configured to actuate the display unit; and
   a lock mechanism configured to prevent removal of the backup power source,
   wherein the lock mechanism is configured to be unlocked when the switch is operated so as to actuate the display unit.

2. The auxiliary power supply device according to claim 1, wherein the switch is a mechanical switch.

3. An industrial machine comprising the auxiliary power supply device according to claim 2.

4. An industrial machine comprising the auxiliary power supply device according to claim 1.

5. The auxiliary power supply device according to claim 1, further comprising a charging circuit that uses electrical power from a charging power supply to charge the backup power supply.

6. The auxiliary power supply device according to claim 1, further comprising a power supply switching circuit electrically connected to the backup power source, the encoder, and the auxiliary power source,
   wherein a higher voltage of output voltages of the backup power source and the auxiliary power source is supplied to the encoder by switching between the backup power source and the auxiliary power source via the power supply switching circuit.

7. An industrial machine comprising:
   a control device configured to supply electric power to an encoder; and
   an auxiliary power supply device configured to supply electric power to the encoder when supply of electric power of the control device is cut off,
   wherein the auxiliary power supply device includes:
      a backup power source configured to supply backup electric power to the encoder when supply of electric power of the control device is cut off;
      an auxiliary power source configured to supply electric power to the encoder when the backup power source is removed;
      a remaining capacity determination unit configured to determine a remaining capacity of the auxiliary power source;
      a display unit configured to display an indication that the remaining capacity is insufficient when the remaining capacity determined by the remaining capacity determination unit is lower than a threshold; and
      a switch that is connected to the auxiliary power source and is configured, in an on state, to:
         supply output voltage from the auxiliary power source to the remaining capacity determination unit to actuate the remaining capacity determination unit; and
         supply output voltage from the auxiliary power source to the display unit to actuate the display unit.

8. The industrial machine according to claim 7, wherein the backup power source comprises a rechargeable battery.

9. The industrial machine according to claim 7, wherein the auxiliary power source comprises a non-rechargeable primary battery.

10. The industrial machine according to claim 7, wherein the backup power source comprises a rechargeable battery, and
    wherein the auxiliary power source comprises a non-rechargeable primary battery.

11. The industrial machine according to claim 7, wherein the auxiliary power source and the backup power source are separately connected to the encoder.

12. The industrial machine according to claim 7, wherein at least one of the auxiliary power source and the backup power source always supplies the electrical power to the encoder when supply of electric power of the control device is cut off.

13. The industrial machine according to claim 7, wherein the auxiliary power supply device includes:
    a base;
    a front panel fixed to the base; and
    a base body fixed to a rear side of the front panel.

14. The industrial machine according to claim 13, wherein the switch is attached to the front panel.

15. The industrial machine according to claim 13, wherein the backup power source is attached to an upper surface side of the base body, and
    wherein the auxiliary power source is attached to a lower surface side of the base body.

16. The industrial machine according to claim 13, wherein the backup power source and the auxiliary power source are fixedly attached to the base body.

17. The industrial machine according to claim 13, wherein the backup power source and the auxiliary power source are fixedly and separately attached to the base body such that the backup power source is removable independently of the auxiliary power source.

18. The industrial machine according to claim 7, further comprising a charging circuit configured to charge the backup power source.

19. An industrial machine comprising:
    a control device configured to supply electric power to an encoder; and
    an auxiliary power supply device configured to supply electric power to the encoder when supply of electric power of the control device is cut off,
    wherein the auxiliary power supply device includes:
       a backup power source configured to supply backup electric power to the encoder when supply of electric power of the control device is cut off;
       an auxiliary power source configured to supply electric power to the encoder when the backup power source is removed;

a remaining capacity determination unit configured to determine a remaining capacity of the auxiliary power source;

a display unit configured to display an indication that the remaining capacity is insufficient when the remaining capacity determined by the remaining capacity determination unit is lower than a threshold; and a switch configured to actuate the display unit, wherein the backup power source is removable only when the display unit is actuated via the switch.

* * * * *